(12) United States Patent
Zhu et al.

(10) Patent No.: US 11,893,330 B2
(45) Date of Patent: Feb. 6, 2024

(54) METHOD AND SYSTEM FOR VISUALIZATION OF 3D ELECTRONIC DEVICE

(71) Applicants: MiaoTech Inc., Shenzhen (CN); Zhenhua Wu, Beijing (CN)

(72) Inventors: Yu Zhu, QC (CA); Zhenhua Wu, Beijing (CN)

(73) Assignee: MiaoTech Inc., Guangdong (CN)

( * ) Notice: Subject to any disclaimer, the term of this patent is extended or adjusted under 35 U.S.C. 154(b) by 522 days.

(21) Appl. No.: 17/105,538

(22) Filed: Nov. 26, 2020

(65) Prior Publication Data
US 2021/0334442 A1   Oct. 28, 2021

(30) Foreign Application Priority Data
Apr. 28, 2020  (CN) .......................... 202010351449.8

(51) Int. Cl.
*G06F 30/31* (2020.01)
*G06T 15/04* (2011.01)
*G06T 15/20* (2011.01)
*G06F 111/18* (2020.01)
*G06F 3/01* (2006.01)

(52) U.S. Cl.
CPC .............. *G06F 30/31* (2020.01); *G06T 15/04* (2013.01); *G06T 15/20* (2013.01); *G06F 3/011* (2013.01); *G06F 2111/18* (2020.01)

(58) Field of Classification Search
USPC ........................................................ 716/139
See application file for complete search history.

(56) References Cited

U.S. PATENT DOCUMENTS

| 2010/0031165 A1* | 2/2010 | Lindquist | ................ H04L 12/66 715/757 |
| 2014/0278266 A1* | 9/2014 | Faken | ..................... G06F 30/20 703/1 |
| 2014/0282324 A1* | 9/2014 | Greiner | ................... G06F 30/39 716/111 |
| 2014/0282328 A1* | 9/2014 | Fried | ..................... G06F 30/398 716/112 |

(Continued)

FOREIGN PATENT DOCUMENTS

| CN | 102566008 A | 7/2012 |
| CN | 107505689 A | 12/2017 |

(Continued)

*Primary Examiner* — Mohammed Alam
(74) *Attorney, Agent, or Firm* — Yu Gang

(57) ABSTRACT

Provided are a method and system for visualization of a 3D electronic device. The method includes: a structural and/or electrical characteristic of the electronic device is simulated to obtain first visualization data, the electronic device including a semiconductor device and/or an integrated circuit and the first visualization data including 3D grid position information of the electronic device and/or a physical quantity at a grid point; the 3D grid position information and/or physical quantity at the grid point in the first visualization data are/is converted into second visualization data suitable for virtual 3D displaying according to a data type; and the second visualization data is rendered in a virtual space to display a structure and/or physical quantity of the electronic device in the virtual space.

18 Claims, 5 Drawing Sheets

(56) References Cited

U.S. PATENT DOCUMENTS

| | | | |
|---|---|---|---|
| 2015/0220244 A1* | 8/2015 | Vats | G06F 3/04845 |
| | | | 715/850 |
| 2017/0092008 A1* | 3/2017 | Djorgovski | G06T 11/206 |
| 2017/0193688 A1* | 7/2017 | Djorgovski | G06T 15/205 |
| 2018/0089349 A1* | 3/2018 | Rezgui | G06F 40/103 |
| 2019/0373738 A1* | 12/2019 | Kozlovski | H05K 1/185 |
| 2021/0334442 A1* | 10/2021 | Zhu | G06T 15/20 |

FOREIGN PATENT DOCUMENTS

| | | |
|---|---|---|
| CN | 107589516 A | 1/2018 |
| CN | 208126003 U | 11/2018 |

\* cited by examiner

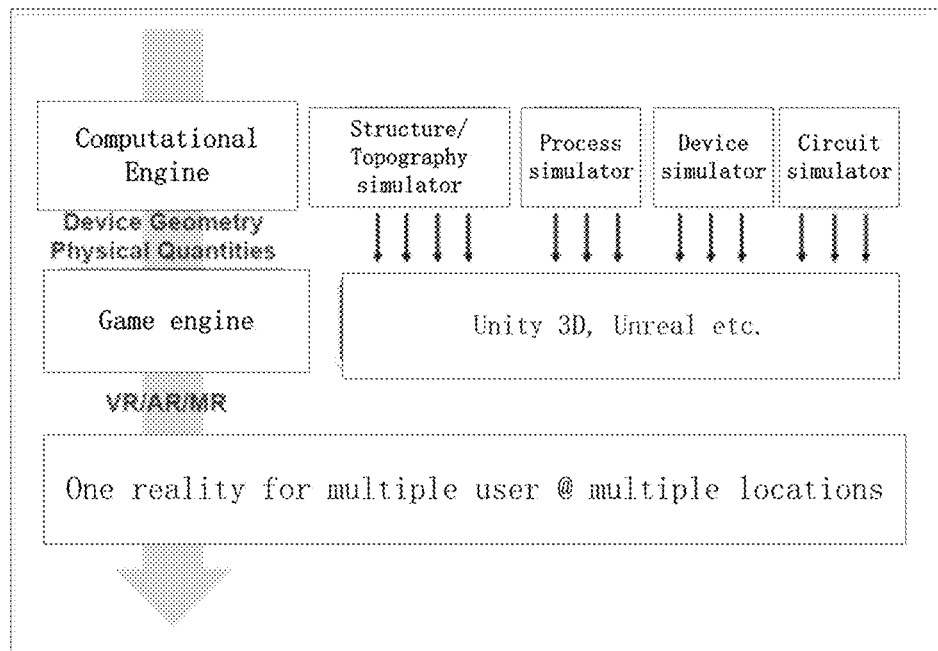

Fig. 3

| simulate a structural and/or electrical characteristic of an electronic device to obtain first visualization data, the electronic device includes a semiconductor device and/or an integrated circuit, and the first visualization data include 3D grid position information of the electronic device and/or a physical quantity at a grid point | ⎯ S401 |

| convert the 3D grid position information and/or physical quantity at the grid point in the first visualization data into second visualization data suitable for virtual 3D displaying according to a data type | ⎯ S402 |

| render the second visualization data in a virtual space to display a structure and/or physical quantity of the electronic device in the virtual space | ⎯ S403 |

Fig. 4

| | |
|---|---|
| 1 | Wafer Setup1 |
| 2 | FEOL |
| ▶ 2.1 | Fin |
| ▶ 2.2 | FinCut |
| ▶ 2.3 | STI |
| ▶ 2.4 | Wells |
| ▶ 2.5 | Gate |
| ▶ 2.6 | Source/Drain |
| ▶ 2.7 | NiSi |
| ▶ 2.8 | RMG |

METHOD AND SYSTEM FOR VISUALIZATION OF 3D ELECTRONIC DEVICE

CROSS-REFERENCE TO RELATED APPLICATION

The present application claims priority benefits to Chinese Patent Application No. 202010351449.8, filed to China National Intellectual Property Administration on Apr. 28, 2020, the contents of which are incorporated herein by reference.

TECHNICAL FIELD

The present disclosure relates to the field of computer aided design of semiconductor devices and integrated circuits, and particularly to a method and system for visualization of a 3D electronic device.

BACKGROUND

In recent years, the Moore's law is experiencing a slowdown when the size of a single transistor is approaching the atomic limit. Therefore, three-dimensional (3D) integrated circuits address the scaling challenge by exploiting the third dimension, namely, changing the transistor geometry from two-Dimensional (2D) to 3D or stacking planar circuits perpendicularly.

For example, the design of the Metal Oxide Semiconductor Field Effect Transistor (MOSFET) has evolved from planar Field Effect Transistor (FET) to the FinFET and the stacked nanosheet FET when the technological node shrinks from micrometers to nanometers. For another example, an existing 3D Vertical Not AND (V-NAND) memory has 92 layers of functional structures, being a skyscraper at the nanometer scale. Furthermore, as shown in FIG. 1, 3D integrated circuits have been fabricated by stacking silicon wafers or dies and interconnecting them vertically. Compared to planar layout, 3D integrated circuits have significant benefits such as higher device density, shorter interconnect, and lower power consumption.

However, the existing Technology Computer Aided Design (TCAD) tools are inadequate and ineffective to handle the complexity of 3D device and circuit design. For example, when the existing TCAD tool is used, device engineers have to keep on dragging and rotating a device with a mouse to view the structure on a 2D screen.

SUMMARY

Embodiments of the present disclosure provide a method and system for visualization of a 3D electronic device, to at least solve the problem in the related art that an existing TCAD may not be adapted to the design complexity of 3D semiconductor devices and integrated circuits.

According to an embodiment of the present disclosure, a method for visualization of a 3D electronic device is provided, which may include that: a structural and/or electrical characteristic of the electronic device is simulated to obtain first visualization data, the electronic device including a semiconductor device and/or an integrated circuit and the first visualization data including 3D grid position information of the electronic device and/or a physical quantity at a grid point; the 3D grid position information and/or physical quantity at the grid point in the first visualization data are/is converted into second visualization data suitable for virtual 3D displaying according to a data type; and the second visualization data is rendered in a virtual space to display a structure and/or physical quantity of the electronic device in the virtual space.

In an embodiment of the present disclosure, the operation that the 3D grid position information and/or physical quantity at the grid point in the first visualization data are/is converted into the second visualization data suitable for virtual 3D displaying according to the data type may include at least one of that: for a geometrical body in the first visualization data, data conversion is performed according to a geometrical size and material property of the semiconductor device/integrated circuit to generate a 3D grid and a texture map; for an iso-surface in the first visualization data, data conversion is performed to generate a 3D scalar field-based iso-surface; for an isoline in the first visualization data, a 3D scalar field-based isoline is constructed on a specified 2D profile; for a heatmap in the first visualization data, a 3D scalar field-based heatmap is constructed on the specified 2D profile; for a streamline cluster in the first visualization data, a 3D scalar field-based streamline cluster is generated by use of a flow conservation principle and a flow flux; density and fluid physical quantities in the first visualization data are converted to be presented by a particle system in a visualization tool; a photon vibration mode of a material in the first visualization data is converted to be presented by a simple harmonic vibration of an atom in a crystal cell; a fermi surface of the material in the first visualization data is converted to be presented by a closed surface of a first Brillouin zone; a 3D energy band of the material in the first visualization data is converted to be presented by a polysurface of the first Brillouin zone; and an amplitude and phase of a wave function in the first visualization data are converted to be presented by a simple harmonic oscillator distributed on a space lattice.

In an embodiment of the present disclosure, before the operation that the 3D grid position information and/or physical quantity at the grid point in the first visualization data are/is converted into the second visualization data suitable for virtual 3D displaying according to the data type, the method may further include that: the first visualization data is stored, a data format of the stored first visualization data including at least one of a finite element non-uniform grid point, a finite difference uniform grid point and a 3D pixel grid point and a file format of the stored first visualization data including at least one of a binary file and an American Standard Code for Information Interchange (ASCII) text file.

In an embodiment of the present disclosure, the operation that the structure and/or physical quantity of the electronic device are/is displayed in the virtual space may include at least one of that: the structure and/or physical quantity of the electronic device are/is displayed in the virtual space according to a process step; the structure and/or physical quantity of the electronic device are/is displayed in the virtual space according to a temporal evolution sequence; the structure and/or physical quantity of the electronic device are/is displayed in the virtual space according to a difference of different process steps or different temporal evolution sequences; and a part, selected by a user, in the structure and/or physical quantity of the electronic device is displayed in the virtual space.

In an embodiment of the present disclosure, after the operation that the structure and/or physical quantity of the electronic device are/is displayed in the virtual space, the method may further include that: an operation instruction of the user for the displayed electronic device is acquired; and the structure and/or physical quantity of the displayed electronic device are/is changed according to the operation instruction.

In an embodiment of the present disclosure, the operation that the structure and/or physical quantity of the displayed electronic device are/is changed according to the operation instruction may include at least one of that: the geometrical size and/or shape of the virtually displayed electronic device are/is changed; a doping concentration and/or doping distribution of a semiconductor material of the virtually displayed electronic device are/is changed; the material property of the virtually displayed electronic device is changed, the material property including at least one of: mobility, stress or electron-hole recombination rate of the semiconductor material, resistivity or work function of a metal material and a dielectric constant of an insulating material; a 3D connection manner of the virtually displayed electronic device is changed; a gate voltage or bias voltage of the virtually displayed electronic device is continuously regulated; and one or more semiconductor materials of the virtually displayed electronic device are added or deleted.

In an embodiment of the present disclosure, the operation instruction may include at least one of a gesture, eye movement, voice, facial expression or head movement of the user, or an instruction generated by operating a virtual laser designator by the user, or an instruction generated by operating an infrared joystick by the user.

In an embodiment of the present disclosure, the structural characteristic and/or electrical characteristic of the semiconductor device/integrated circuit may be simulated to generate the first visualization data in a local server, or a remote server or a cloud.

In an embodiment of the present disclosure, after the operation that the structure and/or physical quantity of the electronic device are/is displayed in the virtual space, the method may further include that: an operation instruction of one or more users for the displayed electronic device in a reality or virtual space is acquired; third visualization data is generated according to the operation instruction; and an operation result, obtained by the one or more users in the reality or virtual space, of the electronic device is presented to another user in the same or different reality or virtual space according to the third visualization data.

In an embodiment of the present disclosure, after the operation that the structure and/or physical quantity of the electronic device are/is displayed in the virtual space, the method may further include: an identification, implemented by the user with a virtualization tool, of the displayed electronic device is acquired and an identification content is stored.

In an embodiment of the present disclosure, after the operation that the structure and/or physical quantity of the virtual electronic device are/is displayed, the method may further include that: image information of the virtual electronic device is acquired; and the image information is uploaded to a social platform or shared through an e-mail.

In an embodiment of the present disclosure, the physical quantity of the electronic device may include at least one of the doping concentration, a charge density, a current density, an energy band edge, a quasi-fermi level, an electrostatic potential, an electric field, the mobility, the stress and heat.

According to another embodiment of the present disclosure, a system for visualization of a 3D electronic device is provided, which may include: a calculation engine, configured to simulate a structural and/or electrical characteristic of the electronic device to obtain first visualization data, the electronic device including a semiconductor device and/or an integrated circuit and the first visualization data including 3D grid position information of the electronic device and/or a physical quantity at a grid; a data conversion unit, configured to convert the 3D grid position information and/or physical quantity at the grid in the first visualization data converted into second visualization data suitable for virtual 3D displaying according to a data type; and a visualization tool, configured to render the second visualization data in a virtual space to display a structure and/or physical quantity of the electronic device in the virtual space.

In an embodiment of the present disclosure, the system may further include a sensor or camera, configured to acquire an operation instruction of operating the virtually displayed electronic device from a user.

In an embodiment of the present disclosure, the operation instruction may include at least one of an instruction generated by a gesture, eye movement, voice, facial expression or head movement of the user, or an instruction generated by operating a virtual laser designator by the user, or an instruction generated by operating an infrared joystick by the user.

In an embodiment of the present disclosure, the calculation engine may include at least one of a material simulation calculation engine, a semiconductor process device simulation calculation engine and a circuit simulation calculation engine.

In an embodiment of the present disclosure, the calculation engine may be arranged in a local server, arranged in a remote server or arranged in a cloud.

In an embodiment of the present disclosure, the electronic device may include at least one of a 3D fin transistor, multiple stacked and connected nanowire transistors, a 3D vertical transistor, a 3D V-NAND memory, a 3D Dynamic Random Access Memory (DRAM), a 3D Ferroelectric Random Access Memory (FeRAM), a 3D Resistance Random Access Memory (RRAM) and a 3D integrated circuit.

In an embodiment of the present disclosure, the visualization tool may include at least one of a Virtual Reality (VR) visualization tool, an Augmented Reality (AR) visualization tool and a Mixed Reality (MR) visualization tool.

According another embodiment of the present disclosure, a storage medium is also provided, in which a computer program may be stored, the computer program being configured to run to execute the steps in any abovementioned method embodiment.

According to another embodiment of the present disclosure, an electronic device is also provided, which may include a memory and a processor. A computer program may be stored in the memory. The processor may be configured to run the computer program to execute the steps in any abovementioned method embodiment.

In the embodiments, a 3D grid position and physical quantity at the grid of the semiconductor device and the integrated circuit are converted to a form suitable for virtual displaying according to the data type, so that the 3D semiconductor device and integrated circuit may be visually presented in a 3D space rather than projected to a 2D plane, and moreover, the 3D operating space is not limited by a screen size.

BRIEF DESCRIPTION OF THE DRAWINGS

The drawings described here are adopted to provide a further understanding to the present disclosure and form a part of the application. Schematic embodiments of the present disclosure and descriptions thereof are adopted to explain the present disclosure and not intended to form improper limits to the present disclosure. In the drawings:

FIG. 3 is a working flowchart of a visualization system according to an embodiment of the present disclosure; and FIG. 4 is a flowchart of a method for visualization of 3D semiconductor and integrated circuit according to an embodiment of the present disclosure;

DETAILED DESCRIPTION OF THE EMBODIMENTS

The present disclosure will be described below with reference to the drawings and in combination with the embodiments in detail. It is to be noted that the embodiments in the application and characteristics in the embodiments may be combined without conflicts.

It is to be noted that the terms like "first" and "second" in the specification, claims and accompanying drawings of the present disclosure are used for differentiating the similar objects, but do not have to describe a specific order or a sequence.

The present disclosure involves a VR, AR or MR system. Detailed discussions will be made below. Although the system is described by term VR throughout the specification, those skilled in the art should know that, in general use of the term, VR may include VR, AR and MR. Under some circumstances, term "VR/AR/MR" is adopted for a visualization system. Therefore, when term "VR" or "VR/AR/MR" is used, it should be understood that all types of visual reality are included, unless otherwise distinguished.

"VR" adopted in the embodiments of the present disclosure may refer to a method of displaying one or elements representing data generated by a computer and/or interacting with the one or more elements representing the data generated by the computer. All elements visible in a field of view of a VR display are usually elements generated by the computer.

"AR" adopted in the embodiments of the present disclosure may refer to a method of displaying one or elements representing data generated by a computer and/or interacting with the one or more elements. AR is a mix of VR and real life. Typical AR displaying includes one or more elements overlaying a real object visible to an operator and generated by the computer. Term "AR" used herein may further include "MR". Term "MR" refers to an AR displaying method including a capability of implementing interaction between a user or the operator and the element generated by the computer.

Virtual displaying adopted in the embodiments of the present disclosure refers to displaying a virtual 3D object and/or interacting with the virtual 3D object. The virtual 3D object is dynamically updated to modify a view of the virtual 3D object for the operator responsive to a movement of the operator or a modification (for example, scaling up/scaling down and translation/rotation over a cross sectional view of the virtual 3D object), requested by the operator, over the view of the virtual 3D object.

Embodiment 1

For solving the problem that the existing TCAD tools, however, are inadequate and ineffective to handle the complexity of three-dimensional device and circuit design, in the embodiment of the present disclosure, VR is adopted as a strong medium for presenting a complex spatial relationship, and a system for visualization of a 3D semiconductor structure and integrated circuit is provided.

Figure 1:
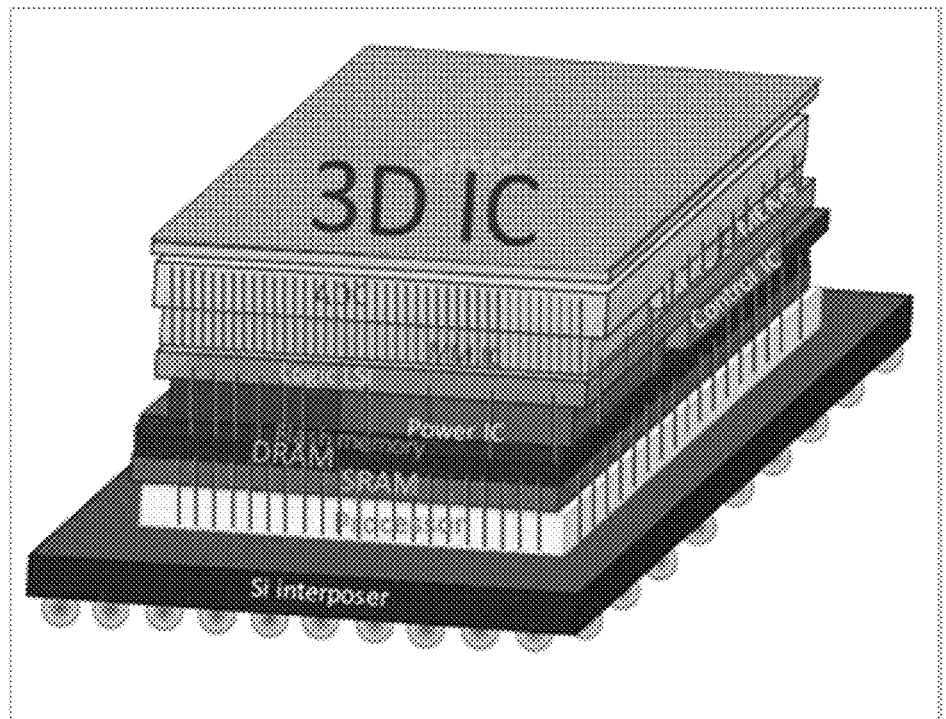
FIG. 1 is a structure diagram of a 3D integrated circuit according to the conventional art.
Figure 2:
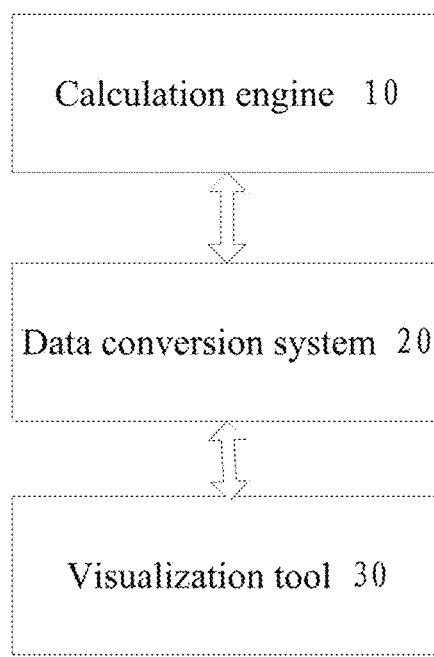
FIG. 2 is a structure block diagram of a visualization system according to an embodiment of the present disclosure.

FIG. 2 shows a visualization system according to an embodiment of the present disclosure. As shown in FIG. 1, the visualization system provided in the embodiment may include three parts: a calculation engine 10, a data conversion system 20 and a visualization tool 30.

In the embodiment, the calculation engine 10 is responsible for providing physical simulation data of a 3D semiconductor device and integrated circuit. The calculation engine may be a material simulation calculation engine, a semiconductor process device simulation calculation engine, a circuit simulation calculation engine and the like.

The calculation engine of the embodiment may be based on commercial TCAD or open-source TCAD. In the embodiment, the calculation engine may simulate the 3D semiconductor device and integrated circuit in advance in a local or remote server or cloud and may also perform simulation in real time to generate data for visualization. The visualization data may include 3D grid points of the 3D semiconductor device and integrated circuit and physical quantities thereon, and these physical quantities are not limited to physical quantities such as a doping concentration, a charge density, a current density, an energy band edge, a quasi-fermi level, an electrostatic potential, an electric field, mobility, a stress and heat.

In the embodiment, the data conversion system 20 is responsible for converting the 3D grid points and physical quantities thereon, generated by the calculation engine, to a form suitable for presentation by the visualization tool. For example, the physical quantities of a geometrical body, an iso-surface, an isoline, a heatmap, a streamline cluster, a particle system, a vibration mode, a fermi surface, a 3D energy band, a wave function and the like are converted to forms suitable for presentation by the visualization tool.

In the embodiment, the visualization tool 30 renders the data in a virtual space by use of a spatial calculation algorithm and computer graphics and visualizes structures and physical quantities of the 3D semiconductor structure and integrated circuit in VR. In the embodiment, these algorithms may be implemented by various visualization technologies for single or multiple users such as VR or AR or MR. In the embodiment, hardware of the visualization tool may be an earphone, smart glasses, a smart phone or a tablet computer, etc. Software of the visualization tool may be constructed in a virtual visualization engine, for example, some virtual game engines.

The visualization system provided in the embodiment may virtually display various semiconductor devices and integrated circuits in the virtual space, for example, a 3D fin transistor, multiple stacked and connected nanowire transistors, a 3D vertical transistor, a 3D V-NAND memory, a 3D DRAM, a 3D FeRAM and a 3D RRAM.

In the embodiment, the visualization system may further include an operation feedback system responsible for changing the virtually presented semiconductor device or integrated circuit according to an operation of a user. For example, the visualization system may include a sensor or camera, and the sensor or camera is configured to detect an operation of the user over the virtual semiconductor device and integrated circuit. For example, an operation executed by the user through a gesture, an eye movement, a voice, a facial expression and a head movement, or an operation executed by the user with a virtual laser designator, or an operation executed by the user through an infrared joystick is detected. The detected operation is converted into an input file of the calculation engine, thereby changing the virtually presented semiconductor device/integrated circuit. For example, a geometrical size or shape of the semiconductor device or the integrated circuit is changed, a doping concentration or doping distribution of a semiconductor material is changed, a material property of the electronic device, for example, mobility, stress or electron-hole recombination rate of the semiconductor material, resistivity or work function of a metal material and a dielectric constant of an insulating material, is changed, a 3D connection manner of the semiconductor device or the integrated circuit is changed, a gate voltage or a bias voltage is continuously regulated, and a certain material is added or deleted.

In the embodiment, the visualization system may further include a multiuser interactive operating system responsible for enabling multiple users to operate the same semiconductor device or integrated circuit in a reality or virtual space. For example:

(1) The multiple users are in the same reality space, and each user may directly see the others and operate the same virtual object through an AR/MR device;
(2) the multiple users are in different reality spaces, and each user may directly see Avatars of the others and operate the same virtual object through a VR device;
(3) each user may identify the virtual object by use of a visualization tool such as a pen, an eraser, a spray gun and a memo and store an identification content in own researches; and
(4) each user may photograph the virtual object, record a video of a physical process and upload a result to a social platform or share the result with the other users through an e-mail in own researches.

In the embodiment, the visualization tool may include multiple VR/AR/MR devices. As a nonrestrictive example, a first operator may wear a first VR/AR/MR device, including, but not limited to, a first head-mounted display, and a second operator may wear a second VR/AR/MR device, including, but not limited to, a second head-mounted display. In the nonrestrictive example, the first operator and the second operator may operate the virtually displayed semiconductor device or integrated circuit together. The first VR/AR/MR device and the second VR/AR/MR device may display views of different parts of the semiconductor device or the integrated circuit.

For describing the visualization system provided in the embodiment of the present disclosure more clearly, FIG. 3 is a working flowchart of a visualization system in a specific application scenario according to an embodiment of the present disclosure. As shown in FIG. 2, the calculation engine provides simulation data of geometrical and physical quantities of an electronic device. The calculation engine may include a structure/topology simulator, a process simulator, a device simulator and a circuit simulator, etc. The simulation data is input to the visualization tool, for example, a game engine, and the visualization tool renders the data in the virtual space by use of the spatial calculation algorithm and the computer graphics. The algorithm is implemented by various VR/AR/MR technologies for single or multiple users. The hardware may be an earphone, smart glasses, a smart phone or a tablet computer. The software may be constructed in any game engine, for example, Unity 3D and Unreal. The semiconductor device or the integrated circuit is presented in the virtual space, and multiple users may operate the same semiconductor device or integrated circuit in the reality or virtual space.

Compared with a conventional Computer Aided Design (CAD) tool, the visualization system provided in the embodiment has the following advantages. (1) Intuitive presentation: In virtual reality, one is immersed in a virtual space where device geometry and physical quantities are presented directly in 3D space rather than projected on a 2D plane. (2) Unlimited workspace: In virtual reality, the operational space is essentially infinite whereas the space is limited by the screen size in the conventional approach. (3) Enhanced cooperation: With augmented reality, co-workers are allowed to work on a virtual device in the same workspace or remotely as if the device was a real one. All these features empowered by VR/AR/MR make the proposed visualization system more suitable for 3D semiconductor device and 3D integrated circuit development/design than conventional TCAD tools.

Embodiment 2

The embodiment provides a 3D visual display method running in the abovementioned visualization system for a semiconductor device and an integrated circuit. FIG. 4 is a flowchart of the according to the embodiment of the present disclosure. As shown in FIG. 4, the flow includes the following steps.

In S401, a structural and/or electrical characteristic of the semiconductor device/integrated circuit is simulated to obtain first visualization data, the first visualization data including 3D grid position information of the semiconductor device/integrated circuit and/or a physical quantity at a grid point.

In S402, the 3D grid position information and/or physical quantity at the grid point in the first visualization data are/is converted into second visualization data suitable for virtual 3D displaying according to a data type.

In S403, the second visualization data is rendered in a virtual space to display a structure and/or physical quantity of the semiconductor device/integrated circuit in the virtual space.

Before S402 of the embodiment, the first visualization data may be stored. For example, a data format for storage may be a finite element non-uniform grid point, a finite difference uniform grid point and a 3D pixel grid point. A file format for storage may be a binary file and an ASCII text file, etc.

The operation in S402 of the embodiment that the 3D grid position and/or the physical quantity at the grid point in the first visualization data are/is converted according to the data type may include at least one of that:

(1) geometrical body: a 3D grid and a texture map are generated according to a geometrical size and material property of the semiconductor device or the integrated circuit, thereby presenting and operating a 3D structure in a calculation engine in a game engine;
(2) iso-surface: a 3D scalar field-based (for example, a charge density, a temperature distribution and an electrostatic potential) iso-surface is generated by use of, for example, a marching cubes algorithm;
(3) isoline: a 3D scalar field-based isoline is constructed on a specified 2D profile;
(4) heatmap: a 3D scalar field-based heatmap is constructed on the specified 2D profile;
(5) streamline cluster: a 3D scalar field-based (for example, an electric field, a magnetic field and a current density field) streamline cluster is generated by use of a flow conservation principle and a flow flux;
(6) particle system: density and fluid physical quantities (for example, the charge density, a carrier concentration, a current and a heat flow) are presented by a particle system in the game engine;
(7) vibration mode: a photon vibration mode of a semiconductor material is presented by a simple harmonic vibration of an atom in a crystal cell;
(8) fermi surface: a fermi surface of a metal material is presented by a closed surface of a first Brillouin zone;
(9) 3D energy band: a 3D energy band of a 2D material is presented by a polysurface of the first Brillouin zone; and
(10) wave function: an amplitude and phase of a wave function are presented by a simple harmonic oscillator distributed on a space lattice.

In S403 of the embodiment, the structure and/or physical quantity of the semiconductor device/integrated circuit are/is virtually displayed in the following manners, for example:

(1) the structure and/or physical quantity of the semiconductor device/integrated circuit are/is displayed in the virtual space according to a process step;
(2) the structure and/or physical quantity of the semiconductor device/integrated circuit are/is displayed in the virtual space according to a temporal evolution sequence;
(3) the structure and/or physical quantity of the semiconductor device/integrated circuit are/is displayed in the virtual space according to a difference of different process steps or different temporal evolution sequences; and
(4) a part, selected by a user, in the structure and/or physical quantity of the semiconductor device/integrated circuit is displayed in the virtual space.

Visualization based on multiple input files, i.e., visualization of temporal evolution of different structures and physical quantities based on multiple pieces of data, in the embodiment will be described below in detail.

The 3D semiconductor device and integrated circuit may be manufactured through multiple complex process steps. The structure and the physical quantity may be changed in each process step. Visualization requirements for the structure and the physical quantity include independent displaying, dynamic evolution displaying of previous and subsequent associated structures or the structure selected by the user and difference comparison displaying of the previous and subsequent structures, etc.

Figures 5, 6:
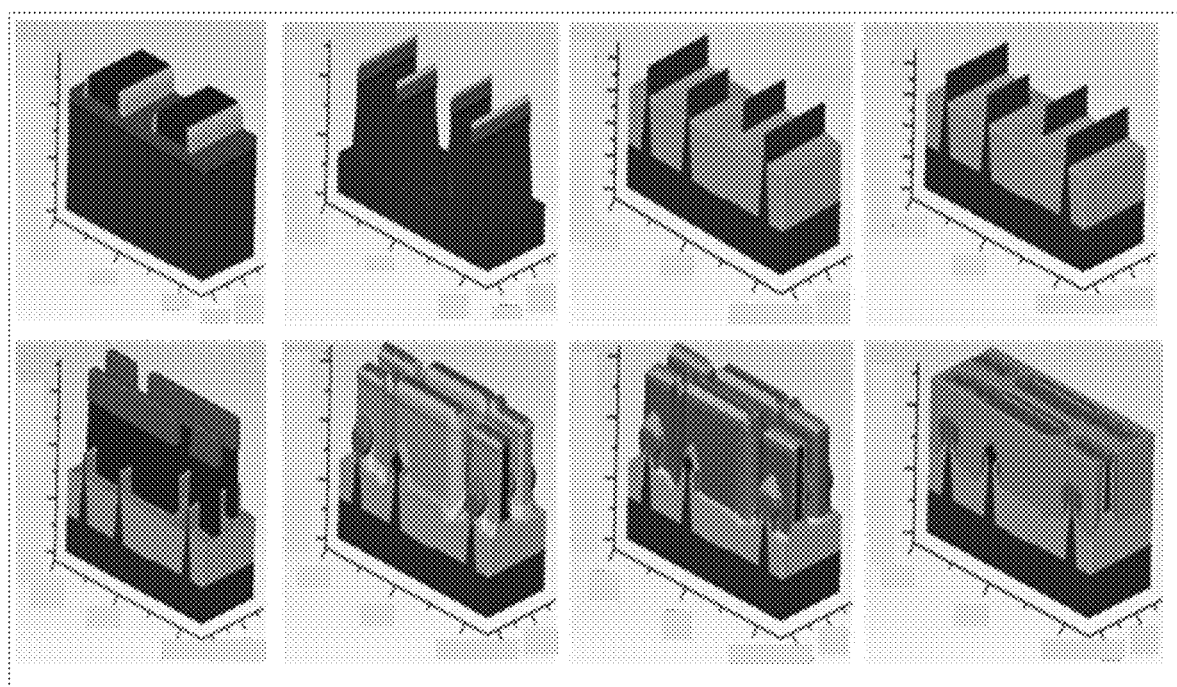
FIG. 5 is a diagram of a front-end process sequence for a 3D fin transistor according to an embodiment of the present disclosure.
FIG. 6 is a corresponding structure diagram of process steps for a 3D fin transistor according to an embodiment of the present disclosure.

For example, a front-end process sequence for a 3D fin transistor (FinFET) is shown in FIG. 5, and each module includes many process steps. FIG. 6 is a corresponding structure diagram of process steps for a 3D fin transistor. In the conventional art, process steps and corresponding structures may be presented by flat panel displaying, and the visualization requirements of the 3D device and circuit may not be met. In the embodiment, changes of the corresponding structures in each process step may be dynamically displayed, and the differences of the previous and subsequent steps may be highlighted by different colors, thereby implementing dynamic evolution displaying of the structure of the device under the front-end process.

After S403 of the embodiment, the structure and/or physical quantity of the virtually displayed semiconductor device/integrated circuit may further be changed according to an operation of the user. For example, the operation of the user over the semiconductor device or the integrated circuit in the visualization tool is converted into an input file of the calculation engine. The following changes may be included:

(1) the geometrical size or shape of the semiconductor device or the integrated circuit is changed;
(2) a doping concentration or doping distribution of a semiconductor material is changed;
(3) the material property of the electronic device is changed, for example, mobility, stress or electron-hole recombination rate of the semiconductor material, resistivity or work function of a metal material and a dielectric constant of an insulating material;
(4) a 3D connection manner of the semiconductor device or the integrated circuit is changed;
(5) a gate voltage or a bias voltage is continuously regulated; and
(6) a certain material is added or deleted.

In an embodiment of the present disclosure, the virtual 3D semiconductor device or integrated circuit may be displayed to the operator on the VR/AR/MR visualization tool. Responsive to one or more prompts from the operator, the calculation engine may modify the displayed 3D semiconductor device or integrated circuit according to a preference of the operator. Through a nonrestrictive example, the operator may scale up, scale down, rotate or move the 3D semiconductor device or integrated circuit presented in the virtual space to better observe or operate the 3D semiconductor device or integrated circuit.

In the embodiment, multiple users may also operate the same semiconductor device or integrated circuit in a reality or virtual space. For example:

(1) the multiple users are in the same reality space, and each user may directly see the others and operate the same virtual object through an AR/MR device;
(2) the multiple users are in different reality spaces, and each user may directly see Avatars of the others and operate the same virtual object through a VR device;
(3) each user may identify the virtual object by use of a virtualization tool such as a pen, an eraser, a spray gun and a memo and store an identification content in own researches; and
(4) each user may photograph the virtual object, record a video of a physical process and upload a result to a social platform or share the result with the other users through an e-mail in own researches.

In an embodiment, the visualization tool may include multiple VR/AR/MR devices, and then a first VR/AR/MR device worn by a first operator may be operably coupled to the calculation engine such that only the first operator may modify the 3D semiconductor device or integrated circuit presented in all the VR/AR/MR devices.

In an embodiment, the calculation engine may receive a relative position and visual orientation of each device in the multiple VR/AR/MR devices and generate a 3D semiconductor device or integrated circuit for each VR/AR/MR device, the 3D semiconductor device or integrated circuit corresponding to each position and each visual orientation of each VR/AR/MR device relative to the first VR/AR/MR device worn by the first operator.

Figure 7:
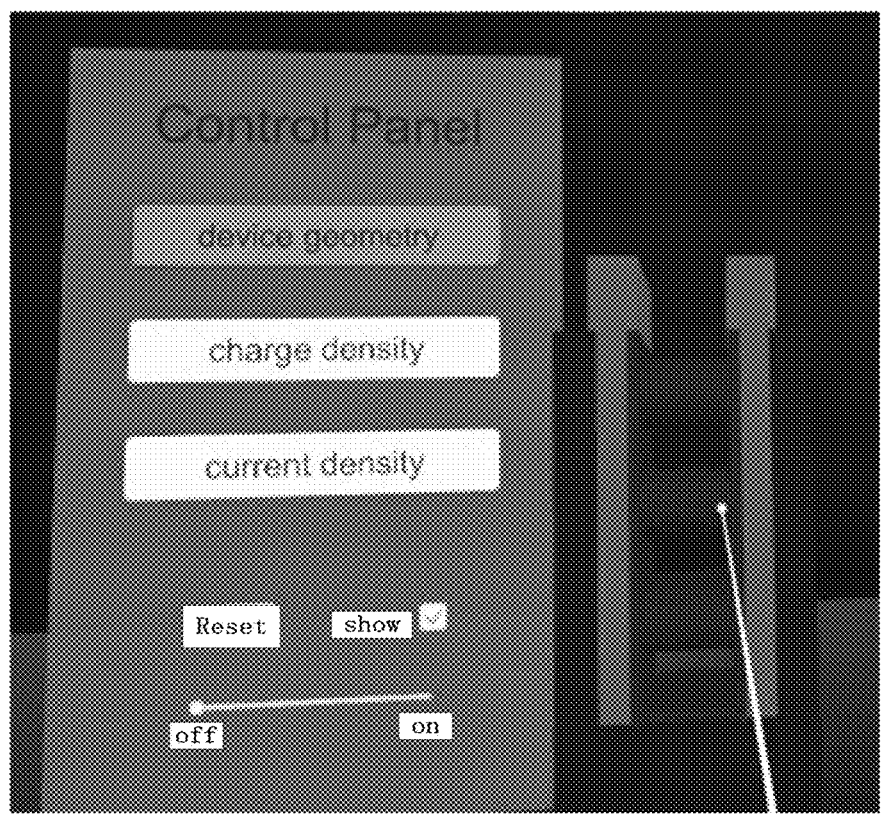
FIG. 7 is a display effect diagram of a 3 nm node nanosheet transistor according to an embodiment of the present disclosure.

For describing the technical solution provided in the embodiment of the present disclosure more directly, FIG. 7 shows a virtual device created according to the embodiment of the present disclosure. As shown in FIG. 7, the device is a promising 3 nm node nanosheet transistor, which consists of a nanosheet channel, a dielectric medium, an oxide, a silicon substrate, a source and a drain. As shown in the figure, the structure may be disassembled with a virtual laser pointer.

Figure 8:
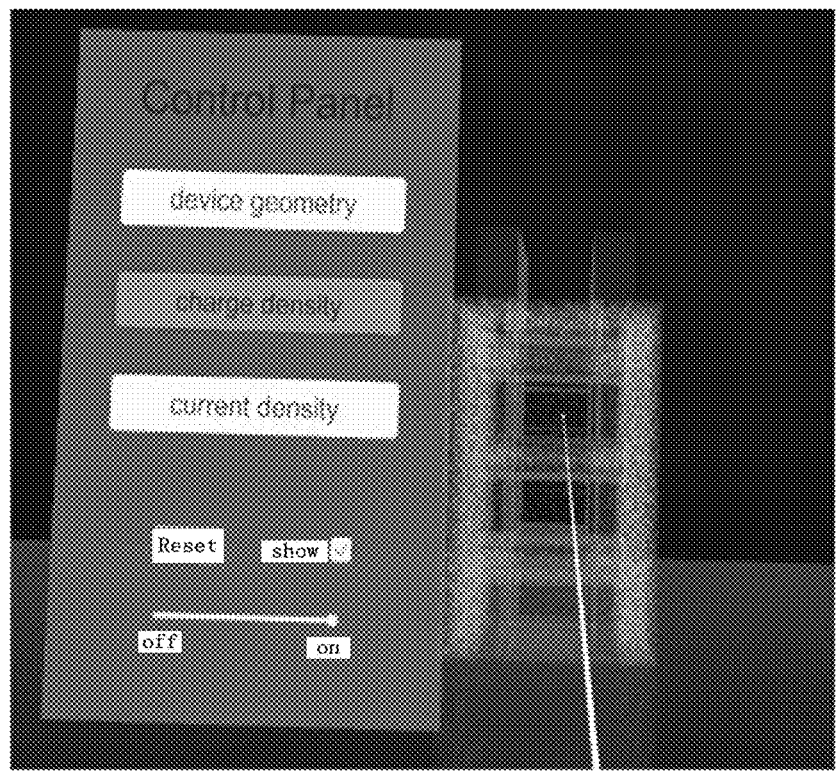
FIG. 8 is a schematic diagram of a charge density of a 3 nm node nanosheet transistor according to an embodiment of the present disclosure.
Figure 9:
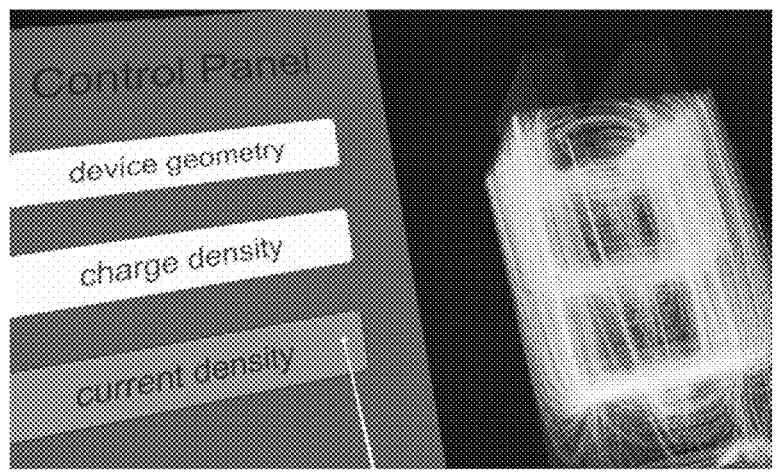
FIG. 9 is a schematic diagram of a current density of a 3 nm node nanosheet transistor according to an embodiment of the present disclosure.

As shown in FIGS. 8 and 9, the user may also investigate charge density and current density by making selections on the canvas. The data is generated by Sentaurus drift-diffusion model, and the result reveals how electric current is leaked in off state.

The visualization method provided in the embodiment for the 3D semiconductor device or integrated circuit has the following advantages. (1) Intuitive presentation: In virtual reality, one is immersed in a virtual space where device geometry and physical quantities are presented directly in 3D space rather than projected on a 2D plane. (2) Unlimited workspace: In virtual reality, the operational space is essentially infinite whereas the space is limited by the screen size in the conventional approach. (3) Enhanced cooperation: With augmented reality, co-workers are allowed to work on a virtual device in the same workspace or remotely as if the device were a real one.

Figure 10:
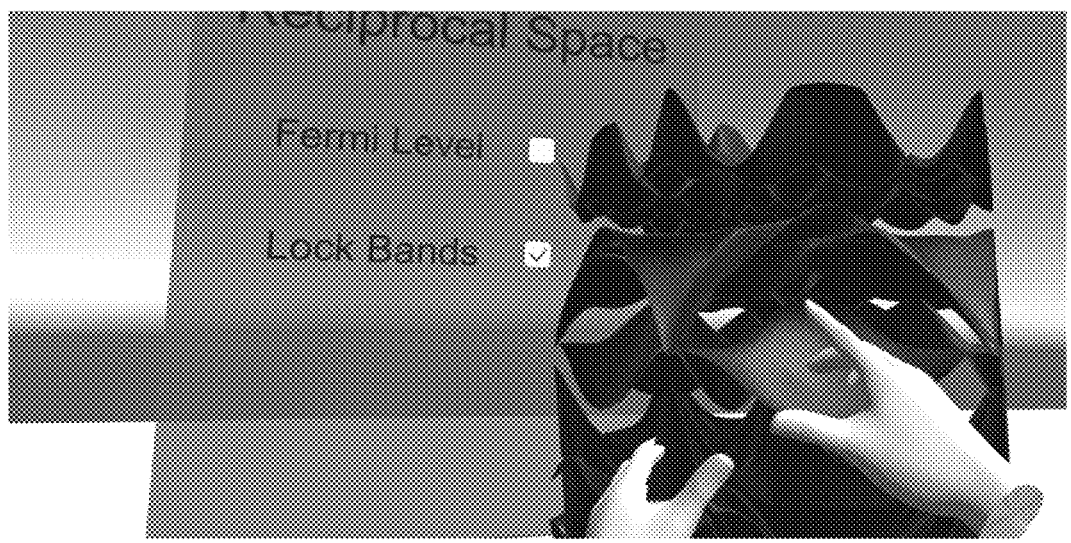
FIG. 10 is a VR effect diagram of a 3D energy band structure according to an embodiment of the present disclosure.

FIG. 10 is a VR effect diagram of a 3D energy band structure according to an embodiment of the present disclosure. A 3D energy band structure of a 2D material AgBr is shown in the figure. In existing display software, an energy band structure diagram is 2D, and a researcher is required to select a plurality of highly symmetric points in, for example, a Brillouin zone, then calculate eigenvalues on a connecting line of these highly symmetric points and draw a 2D energy band. However, the 2D energy band is only a one-dimensional projection of an energy band structure and may not reflect the full view of the energy band structure. The VR visualization solution disclosed in the embodiment allows the user to construct a 3D energy band in the virtual space and execute operations of translation, rotation, scaling up, projection, measurement and the like on the 3D energy band by use of an operating tool such as a virtual hand.

Through the above descriptions about the implementation modes, those skilled in the art may clearly know that the methods according to the embodiment may be implemented in a manner of combining software and a required universal hardware platform and, of course, may also be implemented through hardware, but the former is a preferred implementation mode under many circumstances. Based on such an understanding, the technical solutions of the present disclosure substantially or parts making contributions to a conventional art may be embodied in form of a software product. The computer software product is stored in a storage medium (for example, a Read-Only Memory (ROM)/Random Access Memory (RAM), a magnetic disk and an optical disk), including a plurality of instructions configured to enable a terminal device (which may be a mobile phone, a computer, a server, a network device or the like) to execute the method of each embodiment of the present disclosure.

Embodiment 3

The embodiment of the present disclosure also provides a storage medium, in which a computer program is stored, the computer program being configured to run to execute the steps in any abovementioned method embodiment.

In an embodiment of the present disclosure, in the embodiment, the storage medium may be configured to store a computer program configured to execute the following steps.

In S1, a structural and/or electrical characteristic of the semiconductor device/integrated circuit is simulated to obtain first visualization data, the first visualization data including 3D grid position information of the semiconductor device/integrated circuit and/or a physical quantity at a grid point.

In S2, the 3D grid position information and/or physical quantity at the grid point in the first visualization data are/is converted into second visualization data suitable for virtual 3D displaying according to a data type.

In S3, the second visualization data is rendered in a virtual space to display a structure and/or physical quantity of the semiconductor device/integrated circuit in the virtual space.

In an embodiment of the present disclosure, in the embodiment, the storage medium may include, but not limited to, various medium capable of storing computer programs such as a U disk, a ROM, a RAM, a mobile hard disk, a magnetic disk or an optical disk.

The embodiment of the present disclosure also provides an electronic device, which includes a memory and a processor. A computer program is stored in the memory. The processor is configured to run the computer program to execute the steps in any abovementioned method embodiment.

In an embodiment of the present disclosure, the electronic device may further include a transmission device and an input/output device. The transmission device is connected with the processor, and the input/output device is connected with the processor.

In an embodiment of the present disclosure, in the embodiment, the processor in the embodiment may be configured to execute the following steps through the computer program.

In S1, a structural and/or electrical characteristic of the semiconductor device/integrated circuit is simulated to obtain first visualization data, the first visualization data including 3D grid position information of the semiconductor device/integrated circuit and/or a physical quantity at a grid point.

In S2, the 3D grid position information and/or physical quantity at the grid point in the first visualization data are/is converted into second visualization data suitable for virtual 3D displaying according to a data type.

In S3, the second visualization data is rendered in a virtual space to display a structure and/or physical quantity of the semiconductor device/integrated circuit in the virtual space.

In an embodiment of the present disclosure, specific examples in the embodiment may refer to the examples described in the abovementioned embodiments and optional implementation modes and will not be elaborated in the embodiment.

It is apparent that those skilled in the art should know that each module or each step of the present disclosure may be implemented through a universal computing device. They may be concentrated in a single computing device or distributed in a network formed by multiple computing devices. In an embodiment of the present disclosure, they may be implemented by program codes executable for the computing devices and thus may be stored in a storage device for execution with the computing devices. Moreover, in some cases, the shown or described steps may be executed in sequences different from those described here, or may form various integrated circuit modules respectively, or multiple modules or steps therein may form a single integrated circuit module for implementation. Therefore, the present disclosure is not limited to any specific hardware and software combination.

The above is only the preferred embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection of the present disclosure.

What is claimed is:

1. A method for visualization of a three-Dimensional (3D) electronic device, comprising:
   simulating a structural and/or electrical characteristic of the electronic device to obtain first visualization data, wherein the electronic device comprises a semiconductor device and/or an integrated circuit, and the first visualization data comprise 3D grid position information of the electronic device and/or a physical quantity at a grid point;
   converting the 3D grid position information and/or physical quantity at the grid point in the first visualization data into second visualization data suitable for virtual 3D displaying according to a data type; and
   rendering the second visualization data in a virtual space to display a structure and/or physical quantity of the electronic device in the virtual space;
   wherein converting the 3D grid position information and/or physical quantity at the grid point in the first visualization data into the second visualization data suitable for virtual 3D displaying according to the data type comprises at least one of:
   for a geometrical body in the first visualization data, performing data conversion according to a geometrical size and material property of the semiconductor device/integrated circuit to generate a 3D grid and a texture map;
   for an iso-surface in the first visualization data, performing data conversion to generate a 3D scalar field-based iso-surface;
   for an isoline in the first visualization data, constructing a 3D scalar field-based isoline on a specified Two-Dimensional (2D) profile;
   for a heatmap in the first visualization data, constructing a 3D scalar field-based heatmap on the specified 2D profile;
   for a streamline cluster in the first visualization data, generating a 3D scalar field-based streamline cluster by use of a flow conservation principle and a flow flux;
   converting density and fluid physical quantities in the first visualization data to be presented by a particle system in a visualization tool;
   converting a photon vibration mode of a material in the first visualization data to be presented by a simple harmonic vibration of an atom in a crystal cell;
   converting a fermi surface of the material in the first visualization data to be presented by a closed surface of a first Brillouin zone;
   converting a 3D energy band of the material in the first visualization data to be presented by a polysurface of the first Brillouin zone; and
   converting an amplitude and phase of a wave function in the first visualization data to be presented by a simple harmonic oscillator distributed on a space lattice.

2. The method as claimed in claim 1, before converting the 3D grid position information and/or physical quantity at the grid point in the first visualization data into the second visualization data suitable for virtual 3D displaying according to the data type, further comprising:
   storing the first visualization data, a data format of the stored first visualization data comprising at least one of: a finite element non-uniform grid point, a finite difference uniform grid point and a 3D pixel grid point; and a file format of the stored first visualization data comprising at least one of: a binary file and an American Standard Code for Information Interchange (ASCII) text file.

3. The method as claimed in claim 1, wherein displaying the structure and/or physical quantity of the electronic device in the virtual space comprises at least one of:
   displaying the structure and/or physical quantity of the electronic device in the virtual space according to a process step;
   displaying the structure and/or physical quantity of the electronic device in the virtual space according to a temporal evolution sequence;
   displaying the structure and/or physical quantity of the electronic device in the virtual space according to a difference of different process steps or different temporal evolution sequences; and
   displaying a part, selected by a user, in the structure and/or physical quantity of the electronic device in the virtual space.

4. The method as claimed in claim 1, after displaying the structure and/or physical quantity of the electronic device in the virtual space, further comprising:
   acquiring an operation instruction of the user for the displayed electronic device; and
   changing the structure and/or physical quantity of the displayed electronic device according to the operation instruction.

5. The method as claimed in claim 4, wherein changing the structure and/or physical quantity of the displayed electronic device according to the operation instruction comprises at least one of:
   changing the geometrical size and/or shape of the virtually displayed electronic device;
   changing a doping concentration and/or doping distribution of a semiconductor material of the virtually displayed electronic device;
   changing a material property of the virtually displayed electronic device, the material property comprising at least one of: mobility, stress or electron-hole recombination rate of the semiconductor material, resistivity or work function of a metal material and a dielectric constant of an insulating material;
   changing a 3D connection manner of the virtually displayed electronic device;
   continuously regulating a gate voltage or bias voltage of the virtually displayed electronic device; and
   adding or deleting one or more semiconductor materials of the virtually displayed electronic device.

6. The method as claimed in claim 4, wherein the operation instruction comprises at least one of: a gesture, eye movement, voice, facial expression or head movement of the user, an instruction generated by operating a virtual laser designator by the user, an instruction generated by operating an infrared joystick by the user.

7. The method as claimed in claim 1, wherein the structural characteristic and/or electrical characteristic of the semiconductor device/integrated circuit are/is simulated to generate the first visualization data in a local server, or a remote server or a cloud.

8. The method as claimed in claim 1, after displaying the structure and/or physical quantity of the electronic device in the virtual space, further comprising:
acquiring an operation instruction of one or more users for the displayed electronic device in a reality or virtual space;
generating third visualization data according to the operation instruction; and
presenting an operation result, obtained by the one or more users in the reality or virtual space, of the electronic device to another user in the same or different reality or virtual space according to the third visualization data.

9. The method as claimed in claim 1, after displaying the structure and/or physical quantity of the electronic device in the virtual space, further comprising:
acquiring an identification, implemented by the user with a virtualization tool, of the displayed electronic device, and storing an identification content.

10. The method as claimed in claim 1, after displaying the structure and/or physical quantity of the virtual electronic device, further comprising:
acquiring image information of the virtual electronic device; and
uploading the image information to a social platform, or sharing it through an e-mail.

11. The method as claimed in claim 1, wherein the physical quantity of the electronic device comprises at least one of:
the doping concentration, a charge density, a current density, an energy band edge, a quasi-fermi level, an electrostatic potential, an electric field, mobility, stress and heat.

12. A system for visualization of a three-Dimensional (3D) electronic device, comprising:
a calculation engine, configured to simulate a structural and/or electrical characteristic of the electronic device to obtain first visualization data, wherein the electronic device comprises a semiconductor device and/or an integrated circuit, and the first visualization data comprising 3D grid position information of the electronic device and/or a physical quantity at a grid point;
a data conversion unit, configured to convert the 3D grid position information and/or physical quantity at the grid point in the first visualization data into second visualization data suitable for virtual 3D displaying according to a data type; and
a visualization tool, configured to render the second visualization data in a virtual space to display a structure and/or physical quantity of the electronic device in the virtual space;
a sensor or camera, configured to acquire an operation instruction of operating the virtually displayed electronic device from a user, the operation instruction comprising at least one of: an instruction generated by a gesture, eye movement, voice, facial expression or head movement of the user, an instruction generated by operating a virtual laser designator by the user, an instruction generated by operating an infrared joystick by the user, a sensor or camera, configured to acquire an operation instruction of operating the virtually displayed electronic device from a user, the operation instruction comprising at least one of: an instruction generated by a gesture, eye movement, voice, facial expression or head movement of the user, an instruction generated by operating a virtual laser designator by the user, an instruction generated by operating an infrared joystick by the user.

13. The system as claimed in claim 12, wherein the calculation engine comprises at least one of:
a material simulation calculation engine, a semiconductor process device simulation calculation engine and a circuit simulation calculation engine.

14. The system as claimed in claim 12, wherein the calculation engine is arranged in a local server, or arranged in a remote server or arranged in a cloud.

15. The system as claimed in claim 12, wherein the electronic device comprises at least one of a 3D fin transistor, multiple stacked and connected nanowire transistors, a 3D vertical transistor, a 3D Vertical Not AND (V-NAND) memory, a 3D Dynamic Random Access Memory (DRAM), a 3D Ferroelectric Random Access Memory (FeRAM), a 3D Resistance Random Access Memory (RRAM) and a 3D integrated circuit.

16. The system as claimed in claim 12, wherein the visualization tool comprises at least one of a Virtual Reality (VR) visualization tool, an Augmented Reality (AR) visualization tool and a Mixed Reality (MR) visualization tool.

17. A non-transitory computer-readable storage medium, in which a computer program is stored, the computer program being configured to run to execute the method as claimed in claim 1.

18. An electronic device, comprising a non-transitory memory and a processor, wherein a computer program is stored in the memory; and the processor is configured to run the computer program to execute the method as claimed in claim 1.

* * * * *